United States Patent

Chang et al.

[11] Patent Number: 6,075,770
[45] Date of Patent: Jun. 13, 2000

[54] POWER SPECTRUM-BASED CONNECTION ADMISSION CONTROL FOR ATM NETWORKS

[75] Inventors: Chung-Ju Chang, Taipei; Hung-Ming Chi, Taichung; Ray-Guang Cheng, Keelong; Tzung-Pao Lin, Kaohsiung; Yao-Tzung Wang, Hsinchu, all of Taiwan

[73] Assignee: Industrial Technology Research Institute, Taiwan

[21] Appl. No.: 08/749,371

[22] Filed: Nov. 20, 1996

[51] Int. Cl.[7] ............................................. H04L 12/56
[52] U.S. Cl. ........................ 370/230; 370/252; 370/395
[58] Field of Search ................................. 370/229, 230, 370/231, 232, 233, 234, 235, 238, 252, 253, 395, 396, 398, 412, 413, 415, 417, 465

[56] References Cited

U.S. PATENT DOCUMENTS

| | | | |
|---|---|---|---|
| 5,179,556 | 1/1993 | Turner | 370/233 |
| 5,341,366 | 8/1994 | Soumiya et al. | 370/233 |
| 5,442,624 | 8/1995 | Bonomi et al. | 370/233 |
| 5,583,857 | 12/1996 | Soumiya et al. | 370/233 |
| 5,640,389 | 6/1997 | Masaki et al. | 370/418 |
| 5,675,576 | 10/1997 | Kalampoukas et al. | 370/232 |
| 5,691,975 | 11/1997 | Hamada et al. | 370/232 |
| 5,696,764 | 12/1997 | Soumiya et al. | 370/395 |
| 5,724,513 | 3/1998 | Ben-Nun et al. | 395/200.13 |

OTHER PUBLICATIONS

M. de Prycker, "Asynchronous Transfer Mode Solution for Broadband ISDN," 2d ed., ch. 2.4.5.4, pp. 84–87 (1995).

R. Guérin & M. Naghshineh, "Equivalent Capacity and Its Application to Bandwidth Allocation in High–Speed Networks," IEEE Journal on Selected Areas in Communications, vol. 9, No. 7, pp. 968–981, Sep. 1991.

S.q. Li & S. Chong, "Fundamental Limits of Input Rate Control in High Speed Network," Proc. Infocom '93, pp. 662–671 (1993).

A. Hiramatsu, "ATM Communications Network Control of Neural Networks," IEEE Trans. Neural Networks, vol. 1, No. 1, pp.122–130, Mar. 1990.

T. D. Ndousse, "Fuzy Neural Control of Voice Cells in ATM Networks," IEEE Journal on Selected Areas in Communications, vol. 12, No. 9, pp. 1488–1494, Dec. 1994.

A. R. Bonde, Jr. & S. Ghosh, "A Comparative Study of Fuzzy Versus "Fixed" Thresholds for Robust Queue Management in Cell–Switching Networks," IEEE/ACM Transactions on Networking, vol. 2, No. 4, pp. 337–344, Aug. 1994.

S. q. Li & C. L. Hwang, "Queue Response to Input Correlation Functions: Discrete Spectral Analysis," IEEE/ACM Transactions on Networking, vol. 1, No. 5, Oct. 1994, pp. 522–533.

S. q. Li & C. L. Hwang, "Queue Response to Input Correlation Functions: Continuous Spectra Analysis," IEEE/ACM Transactions on Networking, vol. 1, No. 6, Dec. 1993, pp. 678–691.

C. H. Lin, "Traffic Control for an ATM Network Using Spectral Analysis," Master Thesis, Departement of Communication Engineering, National Chiao Tung University (1994).

R. Chipalkatti, J. F. Kurose & D. Towsley, "Scheduling Policies for Real–Time and Non–Real–Time Traffic in a Statistical Multiplexer," IEEE Infocom '89, pp. 774–783.

Primary Examiner—Chi H. Pham
Assistant Examiner—Kwang B. Yao
Attorney, Agent, or Firm—Proskauer Rose LLP

[57] ABSTRACT

A method and system are disclosed for constructing a power spectrum based connection admission control table and using such a table in a communications network, such as an ATM network. Power spectrum parameters, such as the power spectrum DC component $\gamma$, half power bandwidth $B_w$, and average power $\Psi_w$ are transformed to $\bar{\gamma}$, an equivalent half power bandwidth $B_e$ and an equivalent average power $\Psi_e$, where $B_e$ is a predetermined constant. Since $B_e$ is constant, the transformation reduces the memory requirements for constructing a connection admission control table.

22 Claims, 7 Drawing Sheets

POWER SPECTRUM-BASED CONNECTION ADMISSION CONTROL FOR ATM NETWORKS

RELATED APPLICATION

The subject matter of this application is related to the subject matter of the following patents and patent applications:

(1) U.S. patent application Ser. No. 08/576,808, now U.S. Pat. No. 5,812,526 entitled, "Traffic Control Mechanism in ATM Communications Network," filed on Dec. 21, 1995 for Chung-Ju Chang, Ray-Guang Cheng, Tzung-Pao Lin, Ming-Chia Hsieh and Yao-Tzung Wang; and (2) U.S. patent application Ser. No. 08/568,413, now U.S. Pat. No. 5,771,234 entitled, "Method and System for ATM Cell Multiplexing Under Constant Bit Rate, Variable Bit Rate and Best-Effort Traffic," filed on Dec. 6, 1995 for Chiung-Shien Wun and Gin-Kou Ma.

All of the above-listed patents and patent applications are commonly assigned to the assignee of this application and are incorporated herein by reference.

FIELD OF THE INVENTION

The present invention pertains to communications networks in which information is transmitted from node to node as one or more bitstreams that are organized into packets or cells. The invention is illustrated in the context of an Asynchronous Transport Mode or ATM communications network in which calls or connections are preliminarily set up in each node of a sequence of nodes from end to end of the communication. The invention particularly pertains to, at each node, determining during a set up phase of the communication whether or not to "admit" a new call or connection, i.e., whether or not to allocate resources and to permit receipt of cells of a new call or connection.

BACKGROUND OF THE INVENTION

FIG. 1 depicts an asynchronous transfer mode (ATM) communications network 10. The invention is illustrated herein for a broadband integrated service digital network 10 (B-ISDN) although the invention is equally applicable to other kinds of ATM capable communications networks 10 such as synchronous optical networks (SONET). Furthermore, the model of a telephone network is used to illustrate the invention although the invention is also applicable to cable television networks, computer data networks, etc. The communications network 10 has plural nodes n1, n2, n3, n4, n5, n6, n7, n8, n9, n10, n11 and n12 which are interconnected by communication links. The communication links may include unshielded twisted pairs of wires, coaxial cables, optical fibers, satellite transponders, switches, etc. In the communications network 10, the nodes n1, n2, n3, n4, n5 and n6 are terminal equipments or TE's. For example, the TE's are customer premises equipments or CPE's such as telephones, set top boxes, cable television head ends or host computers. The nodes n7 and n8 are network termination units or NT's. The nodes n9, n10, n11 and n12 are, for example, central office switches which include ATM switches.

Communication is achieved in the communication network 10 by transmitting bitstreams on the links. Each bitstream is organized into fixed length time slots. Each node that desires to communicate writes fixed length packets called "cells" into the timeslots. FIG. 2 depicts an illustrative cell 20. The cell 20 has a header portion 22 into which the node writes overhead control information and a payload portion 24 into which the node writes a message to be conveyed. The node which desires to transmit a cell writes the cell thus generated into a particular time slot of the bitstream transmitted on a selected outgoing link.

According to ATM, communication is achieved by transmitting cells that contain messages along a sequence of nodes of the communications network 10. Specifically, the cells are transmitted via a sequence of individual connections between pairs of nodes of the communications network. See M. DE PRYKER, ASYNCHRONOUS TRANSFER MODE SOLUTION FOR BROADBAND ISDN, 2d ed., ch. 2.4.5.4, p. 84–87 (1995). This sequence of connections is illustratively predefined during a set up procedure when the communication is initiated. For example, to enable communication between the node n1 and the node n4, the following sequence of connections between nodes may be set up from the node n1 to the node n4 as follows:

node n1→node n7→node n9→node n10→node n11→node n8→node n4

Likewise, a return sequence of connections between nodes may be set up from the node n4 to the node n1 as follows:

node n4→node n8→node n11→node n12→node n10→node n9→node n7→node n1.

The node n1 or n4 which generates cells for transmission is referred to as a source node. The node n4 or n1 which is the ultimate intended recipient of the cells is referred to as the destination node. Each other node n7, n9, n10, n11, n8 or n12 is an intermediate node.

A virtual channel (VC) is defined as a communication channel dynamically allocated by a node for transmitting cells of a particular connection to a second device. The collection of all VC's of a sequence of connections is referred to as a virtual channel connection (VCC). In setting up a sequence of connections, a VCC identifier is assigned to the communication. Each node (e.g., the node n8) in the sequence of nodes (e.g., n1, n7, n9, n10, n11, n8, n4) allocates a virtual channel for conveying cells to the next node in the sequence of nodes for the communication (e.g., the node n4). Each node of the sequence of nodes creates an entry in a routing table for each communication. Each entry is indexed by the VCC identifier of the respective communication and contains information regarding how to transmit received (or newly generated) cells to the next node of the sequence of nodes. For instance, the indexed routing table entry may contain an indication of the virtual channel for routing the cell, such as a virtual channel identifier (VCI).

Once the sequence of connections is set up, the source node (e.g., n1) generates one or more cells 20. The source node n1 writes the VCC identifier assigned to the communication in the cell header 22 and messages to be conveyed to the destination node (e.g., n4) in the cell payload 24. The node n1 then writes the generated cells 20 into particular timeslots of an outgoing bitstream transmitted to the next node (e.g., node n7) of the sequence of nodes for that communication. Each intermediate node (e.g., the node n7) which receives the cell 20, utilizes the VCC identifier stored in the cell to access a routing table thereat. The intermediate node (e.g., the node n7) utilizes the retrieved routing table entry (specifically, the VCI of the retrieved routing table entry) to transmit the cell on the appropriate VC to the next node (e.g., node n9) of the sequence of nodes. This process is repeated at each intermediate node (e.g., n9, n10, n11 and n8) until the cell arrives at the destination node n4.

Note also that the ATM protocol permits two nodes to set up semi-permanent connections for conveying multiple simultaneous VCC's between the nodes. Such semi-permanent connections are referred to as virtual paths (VP's). VP's are illustratively also designated in each cell header by a respective virtual path identifier (VPI).

In transmitting cells on VC's, each node writes a cell into a time slot of an outgoing bitstream destined to another node, which time slot is allocated for the VC. Likewise, each node selectively reads cells from timeslots of received incoming bitstreams and performs the same writing operation to other outgoing bitstreams. This form of adding and dropping of cells from different bitstreams is referred to cell layer multiplexing. (Cell layer multiplexing should be distinguished from physical layer multiplexing wherein multiple lower rate bitstreams are simply combined into a higher rate bitstream or a higher rate bitstream is divided into multiple lower rate bitstreams.)

According to ATM, the number of timeslots of specific outgoing bitstreams allocated to carrying cells of each VC varies over time depending on the instantaneous traffic load at that moment at the node. Illustratively, the bandwidth, i.e., bit rate, of each outgoing bitstream is a finite amount, such as 155 Mbits/sec (but need not be the same at each outgoing link of a node). In the event that too much traffic, i.e., too many cells are to be transmitted in an outgoing bitstream, than can be accommodated at that moment, congestion is said to occur. In the event of congestion at a node, the node may discard excess cells. Discarded cells may be retransmitted from the source node upon determining that the cells were discarded. Since congestion tends to be a spontaneous and short duration event, the discarding of cells tends to reduce the traffic load (number of cells to be transmitted in a given bitstream at one time) and alleviate the congestion. Consider that some source nodes produce cells at a constant rate while other produce cells at a variable rate which exhibits a mean bit rate and a peak bit rate. Furthermore, the arrival of cells from each source node is somewhat randomly distributed over time. Therefore, congestion is alleviated in spite of the fact that discarded cells are retransmitted from the source node.

When cells are discarded, a delay is introduced in the delivery of those cells. This poses a problem in the communication system 10. Consider that cells may contain messages for different types of communications. In some communications, the cells may contain general transactional data. Such cells are generally not time sensitive; a delay in transmitting cells does not degrade the communication. On the other hand, in other communications, the cells may contain video, audio or interactive communication information. Such cells are very time sensitive. Delayed video or audio data bearing cells can cause audio and video decoders to underflow, resulting in psycho-audially or psycho-visually perceptible discontinuities in the audio or video. Such discontinuities are at best annoying and at worst render the audio or video unintelligible. Delays in interactive data bearing cells can produce echoes if there is a cross-coupling between both directions of the communication. Alternatively, the delays may require that the participants on each end of the communication wait perceptibly long periods before receiving a response to their messages. This degrades the interactive communication since neither echoes nor perceptible delays occur in an ordinary interactive conversation.

Each communication may be associated with a quality of service or (QoS) requirement. QoS may be expressed in terms of different maximum communication tolerances such as cell transfer delay, delay jitter, cell loss ratio and/or burst cell losses. Generally speaking, interactive, audio and video data bearing cells have more strict QoS requirements than transactional computer data. Nodes may use the QoS of each communication as a basis for avoiding congestion. However, the occurrence of congestion and the prediction of traffic loads in general is a non-linear function.

The prior art has suggested several methods for controlling congestion and admission (described below) in an ATM communications network. See R. Guèrin, H. Ahamadi & M. Nagahshineh, Equivalent Capacity and Its Application to Bandwidth Allocation in High-Speed Networks, IEEE J. SELECT. AREAS COMM., vol. 9, no. 7, pp. 968–981, September., 1991; S. Q.Li & S. Chong, Fundamental Limits of Input Rate Control in High Speed Network PROC. INFOCOM'93, pp. 662–671 (1993); A. Hiramatsu, ATM Communications Network Control by Neural Networks, IEEE TRANS. NEURAL NETWORKS, vol. 1, no. 1, pp. 122–130, March, 1990; T. D. Ndousse, Fuzzy Neural Control of Voice Cells in ATM Networks, IEEE J. SELECT. AREAS COMM., vol. 12, no. 9, pp. 1488–1494, December 1994; A. Bonde & S. Ghosh, A Comparative Study of Fuzzy Versus "Fixed" Thresholds for Robust Queue Management in Cell-Switching Networks, IEEE TRANS. NETWORKING, vol. 2, no. 4, pp. 337–344, August 1994; U.S. Pat. No. 5,341336; U.S. Pat. No. 5,179,556; and U.S. Pat. No. 5,442,624. The traffic control strategies can be categorized into two categories, namely, admission control and congestion control. The admission control strategies determine whether or not a particular node should establish a VC for a new communication based on whether or not the additional cells produced by the new communication are likely to cause congestion. The congestion control strategies adjust the production of cells for each communication for which a VC has already been established by a particular node in an attempt to reduce the traffic load at the node and thereby avert the occurrence of congestion.

The Guèrin reference proposes an "equivalent capacity method" for determining whether or not to admit a new communication to (accommodate the communication by allocating a VC during set up at) a node. The node receives the mean bit rate, the peak bit rate, the peak bit rate duration and a QoS requirement for the new communication. Using these parameters, the node simulates a multimedia traffic source through a linear mathematical analysis in order to determine the bandwidth that the node must provide in order to accommodate the new communication. The disadvantage of this method is that the linear mathematical analysis is complicated requiring the use of approximations in order to perform the requisite calculations in real time. Furthermore, in order to guarantee the QoS requirement of the new communication, the node must overestimate the equivalent capacity needed by the new communication. Based on simulation analysis, this method results in a low utilization of system resources. That is, far too many communications are refused admission to each node resulting in under-utilization of the bandwidth of each outgoing bitstream at each node.

The Hiramatsu reference proposes to use a neural network to "learn" the relationship between the QoS which can be delivered by the network and the communication parameters observed at the node (e.g., cell arrival rate, cell loss rate, etc.) and specified by the new communication (e.g., average bit rate, bit rate fluctuation, etc.). Based on the learned relationship, a node can determine whether or not to admit a new communication. There are several problems with this technique. First, the number of neural nodes is closely related to the complexity of the decision function evaluated in determining the QoS to communication parameter relationship. Currently, there is no well-defined and comprehensive model which can be used as a frame of reference in designing the decision function. Second, the decision function that the neural network "learns" is relevant to only a particular kind of traffic. If there is any traffic change in the network, the neural network must be retrained to the new network conditions, possibly requiring the addition of neural nodes.

The Li reference proposes a two-threshold congestion control method. Each node which transmits cells to another node is presumed to operate according to a "leaky-bucket" mechanism. According to the leaky bucket mechanism, cells which are to be transmitted are stored in a queue. A token pool is provided with first and second types of tokens. If a token is available in the token pool and a cell is available for output at the head of the queue, the available cell is outputted from the queue and a token is deleted from the token pool. Tokens are replenished to the pool on a constant time basis. Initially, only tokens of the first type are used to output cells. When the first type of tokens are completely depleted, tokens of the second type are then used to transfer cells to the output queue. In the event too many cells are received than total tokens of the first and second type (and which can be buffered in the queue), the excess cells are discarded. In the event congestion occurs at the recipient node, then cells corresponding to tokens of the second type are discarded to avert congestion. The total number of cells of the first type correspond to a first threshold of cells which are not discarded in the event of congestion. The total number of cells of the second type correspond to a second threshold. The cells corresponding to the second type of tokens (produced beyond the first threshold, but below the second threshold) might be discarded in the event of congestion. Those cells produced beyond the second threshold are automatically discarded to avert congestion. The problem with this method is that it is difficult to acquire complete statistics on the occurrence of congestion in a communications network. Therefore, it is difficult to establish the two thresholds. Furthermore, the rationale for establishing the two thresholds is unclear.

U.S. Pat. No. 5,179,556 proposes a traffic control mechanism directed to prioritizing cells for selected transmission depending on whether or not the cells are part of a burst. A source of cells "encodes" the cells to indicate whether the cells are at the start, middle or end of a train of cells in a burst. Lone cells not part of a burst are not encoded. Each node has a state machine associated with each outgoing link. The state machine determines whether or not to block or transmit received cells. (The state machines can only have two states: block or transmit). The state machine decodes each encoded cell and uses the burst codes as a basis for permitting a transition from one state to another. That is, a state machine can transition from the blocking state to the transmit state, or vice versa, only at the beginning or end of a burst, not in the middle of a burst. This reference also proposes a connection admission mechanism which uses a single threshold to determine whether or not to admit a new communication to a node. The problem with this reference is that traffic loads are difficult to predict thus making it difficult to establish appropriate criterion (i.e., thresholds) for determining when to transition from a transmit state to a blocking state or when there is available capacity to support new communications at a node.

U.S. Pat. No. 5,341,366, the Bonde reference and the Ndousse reference propose to use fuzzy logic and fuzzy set theory in either congestion or admission control. Fuzzy logic and fuzzy sets can best be explained in comparison to ordinary logic and sets. In ordinary logic, each constant and logical predicate may have only one of two values, namely, true or false (or 0 or 1). In fuzzy logic, each constant and predicate may have a whole continuum of values between true and false or 0 or 1. These values represent a possibility between 0 and 1 that the corresponding fuzzy logic constant or predicate is true. Likewise, in ordinary set theory, a predicate function can be defined over a group of set elements which determines whether or not a set element is contained in a given set with absolute certainty. A mathematical expression which converts values to such possibilities is referred to as a membership function.

The references Ndouse, Bonde and U.S. Pat. No. 5,341,366 use fuzzy logic to control congestion or admission in a communications network. Ndouse uses fuzzy logic in the above-noted leaky bucket mechanism to adjust the thresholds at which selective discarding of cells occurs at a node to control the traffic load. Bonde also uses fuzzy logic to control the selective discarding of cells to adjust the traffic load at a node. Bonde uses fuzzy logic to determine the fraction of cells to discard based on the occupancy of the input cell queue of a node. U.S. Pat. No. 5,341,266 uses fuzzy logic to control the admission of new communications at a node. However, there is no general technique to design a fuzzy logic engine for the admission controller (or congestion controller). Moreover, it is hard for a fuzzy logic admission controller to adapt itself to a dynamic environment (e.g., changing traffic loads and patterns).

U.S. Pat. No. 5,442,624 (Bonomi) proposes a dynamic access control method for an ATM network. In the Bonomi technique, the rate at which each source can provide packets to each node is dynamically changed based on the level of congestion in the respective VCC that carries the data of the source. To that end, each node periodically transmits so called "scout" cells on each VCC. The scout cell propagates from node to node unless it is discarded as a result of congestion at a particular node. If and when the scout cell reaches the destination node, it is transmitted back on the return VCC to the node which issued it. If the scout cell is received at the node from which it originally issued, the node from which it originally issued determines that there is no congestion on the respective VCC and the rate at which the source provides cells to that node for communication on that VCC is increased. On the other hand, if the scout cell is not received at the node from which it originally issued, the node which originally issued the scout cell determines that the scout cell has been discarded as a result of congestion on the VCC and the node decreases the rate at which the source can produce cells for communication on that VCC. There are two problems with this technique. First, the scout cell may be discarded as a result of congestion on the return path rather than the forward path. This would cause a node to erroneously to reduce the cell transmission rate on the forward path. Second, considering that each node on the VCC periodically transmits scout cells, the scout cells themselves increase the load on the network and increase the likelihood of congestion.

The techniques described above utilize traffic parameters measured in the time domain to describe the characteristics of the incoming traffic for purposes of setting an admission control policy for adverting congestion. However, these parameters provide little information about the correlation of the traffic. As a result, the admission control policy is set based on incomplete information resulting in non-optimal utilization of bandwidth. San-Qu Li & Chia-Lin Hwang, Queue Response to Input Correlation Functions: Discrete Spectra Analysis, IEEE/ACM TRANS. ON NETWORKING, Vol.

1, No. 5, October 1994, pp. 522–533, San-Qu Li & Chia-Lin Hwang, Queue Response to Input Correlation Functions: Continuous Spectra Analysis, IEEE/ACM TRANS. ON NETWORKING, Vol. 1, No. 6, December 1993, pp. 678–691, and C. H. Lin, Traffic Control for an ATM Network Using Spectral Analysis, Master Thesis, Department of Communication Engineering, National Chiao Tung University (1994) have studied traffic parameters measured in the frequency domain to describe the characteristics of the incoming traffic. According to these references, multi-media traffic, in particular, the cell production rates of sources communicating voice or video information are considered to be highly correlated. For instance, a variable rate video signal produced according to MPEG will have a bit rate which depends upon whether intracoding or interceding is used wherein the bit rate is higher when intracoding is used as opposed to intercoding. Certain kinds of pictures, namely, I pictures, use only intracoding, whereas other kinds of pictures, such as P pictures and B pictures, may use either intracoding or intercoding (but tend to use little intracoding). Typically, the choice of whether or not each picture in a sequence of pictures is an I, P or B picture is predetermined according to a repeated sequence. For instance, every tenth picture in a sequence of pictures may be an I picture, every fourth and seventh picture may be a P picture, and every second, third, fifth, sixth eight and ninth picture may be a B picture.

According to these references, a typical multi-media traffic stream is modeled by a Markov modulated Poisson process (MMPP) as shown in FIG. 3. In such an MMPP model, the macro level correlation of the cell production rate of the source is modeled by a Markov chain wherein each state of the Markov chain is associated with a constant input rate. This reflects the macro level non-randomness of cell production, e.g., as in the case of encoded video, with a definite, I, P and B picture structure. On the other hand, in each state of the Markov chain, the arrival time of each individual cell is assumed to be random and is characterized by the Poisson distribution. Assume the cell production rate a(t) is an N+1 state MMPP represented as $(Q, \vec{\gamma})$ where $Q$ is the state transition rate matrix and $\vec{\gamma} = (\gamma_0, \gamma_1, \ldots, \gamma_N)$ is the vector representing the arrival rate at each MMPP state. Such a matrix Q and vector $\vec{\gamma}$ can be easily generated from the mean cell production rate $R_M$, cell production peak rate $R_P$ and mean peak cell production rate duration $T_D$, given the above assumptions for video (or similar reasoning for voice), using the following equations:

The steady state probably vector of Q is denoted by $\vec{\pi} = (\pi_0, \pi_1, \ldots, \pi_N)$. $\vec{\pi}$ can be solved by setting $\vec{\pi} Q = 0$ and $\vec{\pi}\vec{e} = 1$ where $\vec{e}$ is a column vector with all elements equal to one. The average input rate $\vec{\gamma}$ is then given by $$\bar{\gamma} = \sum_{i=0}^{N} \gamma_i \pi_i \qquad (1)$$

Q is diagonalizable, and by spectral decomposition Q can be represented as $$Q = \sum_{l=0}^{N} \lambda_l \vec{g}_l \vec{h}_l, \qquad (2)$$

where $\lambda_1$ is the $1^{th}$ eigenvalue and $\vec{g}_1$ ($\vec{h}_1$) is the associated right column (left row) eigenvector of Q with respect to $\lambda$.

The auto-correlation function on an MMPP is defined as $$R(\tau) = \overline{a(t)a(t+\tau)}$$

and its corresponding power spectral density $P(\omega)$ can be obtained from:

$$R(\tau) = \bar{\gamma}\delta(\tau) + \psi_0 + \sum_{l=1}^{N} |\psi_l| e^{\text{Re}\{\lambda_l\}|\tau|} \cos(\text{Im}\{\lambda_l\}|\tau| + arg\{\psi_l\}) \qquad (3)$$

and $$P(\omega) = \bar{\gamma} + 2\pi\psi_0 \delta(\omega) + \sum_{l=1}^{N} b_l(\omega) \qquad (4)$$

where $\text{Im}\{\cdot\}$, $\text{Re}\{\cdot\}$, and $arg\{\cdot\}$ denote the imaginary part, the real part, and the phase of the argument, respectively. $\psi_0$ is the DC component of the power spectral density $P(\omega)$ given by $$\psi_0 = \bar{\gamma}^2, \qquad (5)$$

and $\psi_1$ is the average power contributed by $\lambda_1$ and is given by $$r_N = R_p, \; r_i = \frac{r_N}{N} \cdot i, \; \text{for } i = 0, \ldots, N-1$$

$$Q = \begin{bmatrix} -N\beta & N\beta & 0 & . & . & . & 0 \\ \alpha & -\alpha - (N-1)\beta & (N-1)\beta & 0 & . & . & . \\ 0 & 2\alpha & -2\alpha - (N-2)\beta & (N-2)\beta & 0 & . & . \\ . & . & . & . & . & . & . \\ . & . & . & . & . & . & 0 \\ . & . & . & 0 & (N-1)\alpha & -(N-1)\alpha - \beta & \beta \\ 0 & . & . & . & 0 & N\alpha & -N\alpha \end{bmatrix}$$

$$R_M = \frac{\alpha}{\alpha + \beta} r_N, \qquad \alpha = \frac{1}{T_D}$$

$$\psi_l = \sum_i \sum_j \pi_i \gamma_i \gamma_j g_{li} h_{ij} \quad \text{for } 1 \leq l \leq N, \qquad (6)$$

where $g_{1i}$ and $h_{1j}$ are $i^{th}$ and $j^{th}$ entities of the vector, respectively; $b_1(\omega)$ is the bell function with respect to $\lambda_1$ and is given by $$b_l(\omega) = \frac{-2\psi_l \text{Re}\{\lambda_l\}}{(\text{Re}\{\lambda_l\})^2 + (\omega - \omega_l)^2} \qquad (7 \text{ and } 8)$$

$$= \frac{\psi_l B_l}{\left(\frac{B_l}{2}\right)^2 + (\omega - \omega_l)^2}, \quad \text{for } \lambda_l \neq 0;$$

and $$\frac{1}{2\pi} \int_{-\infty}^{+\infty} b_l(\omega) d\omega = \psi_l, \qquad (9)$$

where $B_1 = -2\text{Re}\{\lambda_1\}$ is the half-power bandwidth and $\omega_1 = \text{Im}\{\lambda_1\}$ is the central frequency of the bell-shaped function $b_1(\omega)$.

From eq.(4), note that the power spectral density $P(\omega)$ is constituted by white nose $\bar{\gamma}$, DC component $2\pi\psi_0\delta(\omega)$, and a set of bell-shaped functions $b_1(\omega)$. From eq.(8), note also that the bell-shaped function $b_1(\omega)$ is located at the central frequency $\omega_1 = \text{Im}\{\lambda_1\}$ and weighted by the average power $\psi_1$. The shape of $b_1(\omega)$ is determined by the half-power bandwidth $B_1 = -2\text{Re}\{\lambda_1\}$. The white noise is contributed by the Poisson local dynamics. If the source is MMDP (Markov Modulated Deterministic Process), it has no white noise component as it has no local dynamic in each state. From the studies in the Li and Hwang references, the results show that the influence of the white noise on a queuing system can be neglected.

The Lin reference has proposed to construct an admission control criterion using the above power spectrum modelling. Specifically, each node models a number of variable bit rate sources, based on an expected QoS requirement and likely received parameters $R_M$, $R_P$ and $T_D$ using the above analysis, to produce the three power spectrum parameters ($\bar{\gamma}, B, \Psi$) for each modelled source. (Only one half-power bandwidth B is produced since each source is presumed to have only a single bell function b.) The spectrum parameters are then used to construct a connection admission control table. The problem with this strategy is that such a CAC table is complex and has a very large dimension.

It is an object of the present invention to overcome the disadvantages of the prior art.

SUMMARY OF THE INVENTION

This and other objects are achieved by the present invention. An illustrative environment of use of the invention is a communications network comprising a plurality of nodes. Communication is achieved by transmitting between pairs of nodes a bit stream that is organized into packets or cells. Illustratively, the communications network is an ATM communications network. Cells are communicated from a source node to a destination node via a sequence of zero or more intermediary nodes. A cell is communicated between each pair of nodes via a virtual channel (VC) that is preliminarily set up by the two nodes for the particular communication. In setting up the communication, in particular the VC's between each individual pair of nodes in the sequence of nodes, each node preliminarily determines whether or not to admit the new call or connection in response to a request received from another node in the communication. Each request indicates certain parameters describing the cell production/arrival rate of the new communication. For example, the requests can specify the mean cell production/arrival rate $R_M$, the peak cell production/arrival rate $R_M$ and the mean peak cell production/arrival duration $T_D$. In determining whether or not to admit a new call, the node must ensure that a requisite quality of service (QoS) is maintained for all admitted calls.

The cell production/arrival rate parameters can be transformed into frequency domain parameters, namely, the power spectrum DC component $\bar{\gamma}$, the average power $\Psi_w$ and the half-power bandwidth $B_w$, based on a MMPP modelling of the source cell production rate. However, the number of parameters is too great for practical use in constructing a call admission table. According to the invention, it has been discovered that two sources can have the same quality of service but different half-power bandwidths $B_w$. Moreover, for any given QoS, the half-power bandwidth can always be set to some constant value, e.g., a predetermined "equivalent" half power bandwidth $B_e$. This merely requires a corresponding transformation of $\Psi_w$ to $\Psi_e$ to reflect the change from $B_w$ to $B_e$ ($\bar{\gamma}$ does not vary with changes in B). Moreover, if $B_e$ is selected sufficiently small, it will always be lower than any expected value of B for any predictable cell source. In such a case, the transformation of $\Psi_w$ (corresponding to $B_w$ of the cell source) to $\Psi_e$ (corresponding to the predetermined constant $B_e$) illustratively can be achieved by simply low pass filtering and integrating $\Psi_w$ using a suitably chosen filter cutoff frequency $\omega_c$.

According to one embodiment, a method is provided for constructing a power spectrum based connection admission control table including the steps of:

(a) using a predetermined scheduling policy and a predetermined quality of service for communications, determining a maximum equivalent aggregate average power $\Psi_{max}$ of the arrival rate of cells for all calls admitted to a node, which still maintains the predetermined QoS, as a function of an aggregate power spectrum DC component $\bar{\gamma}_T$ and a constant equivalent half-power bandwidth $B_e$ of the arrival rate of cell for all calls, for which $B_e$ individual component equivalent average powers $\Psi_e$ are determined for all calls, (b) storing the value of $\Psi_{max}$ determined in step (a) in a table entry that is indexed by the value of $\bar{\gamma}_T$ used to determined the stored value of $\Psi_{max}$, and (c) repeating steps (a)–(b) for multiple different values of $\bar{\gamma}_T$ in a range of expected values for $\bar{\gamma}_T$.

According to another embodiment, a method is provided for admitting calls using a power spectrum based connection admission control table according to the following steps:

(a) producing power spectrum DC component $\bar{\gamma}$, half power bandwidth $B_w$, and average power $\Psi_w$ parameters of a cell arrival rate of a new call, (b) transforming the parameters $\bar{\gamma}$, $B_w$, $\Psi_w$ to $\bar{\gamma}$, an equivalent half power bandwidth $B_e$, and an equivalent average power $\Psi_e$, wherein $B_e$ is a predetermined constant, (c) retrieving from a predetermined table, a maximum aggregate equivalent average power $\Psi_{max}$ that can be accommodated by the node for all admitted calls which is indexed by the sum of an aggregate power spectrum DC component $\bar{\gamma}_T$ for all calls currently admitted at the node and $\bar{\gamma}$, and (d) determining whether or not to admit the call by comparing a sum of an aggregate average power $\Psi_T$ of all calls currently admitted and $\Psi_e$ to $\Psi_{max}$.

In short, the invention provides a practical manner of admitting calls based on frequency domain parameters which are better correlated to traffic patterns than time domain parameters. In particular, the invention provides a technique of reducing the number of frequency domain parameters to be considered in determining whether or not to admit a call. This results in a drastic reduction in memory requirements at each node.

DETAILED DESCRIPTION OF THE INVENTION

As noted above, certain power spectrum components, most notably, the DC component $\bar{\gamma}$, the half-power band with B, and the average power $\Psi$ of the bell function, are well correlated with the cell production rate of an input source. However, as noted above, three parameters are too many for practically implementing a connection admission control table. According to the invention, the number of parameters can be reduced, thereby simplifying the connection admission control table for use in an actual implementation.

Figure 1:
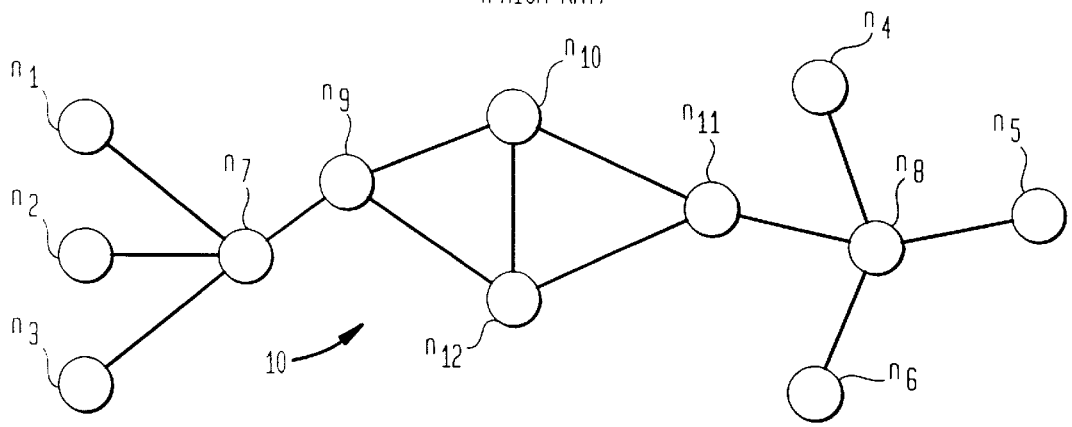
FIG. 1 shows a conventional communications network.
Figure 2:
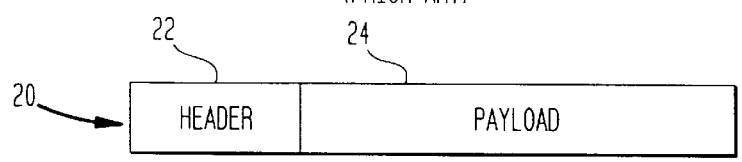
FIG. 2 shows a conventional cell.
Figure 4:
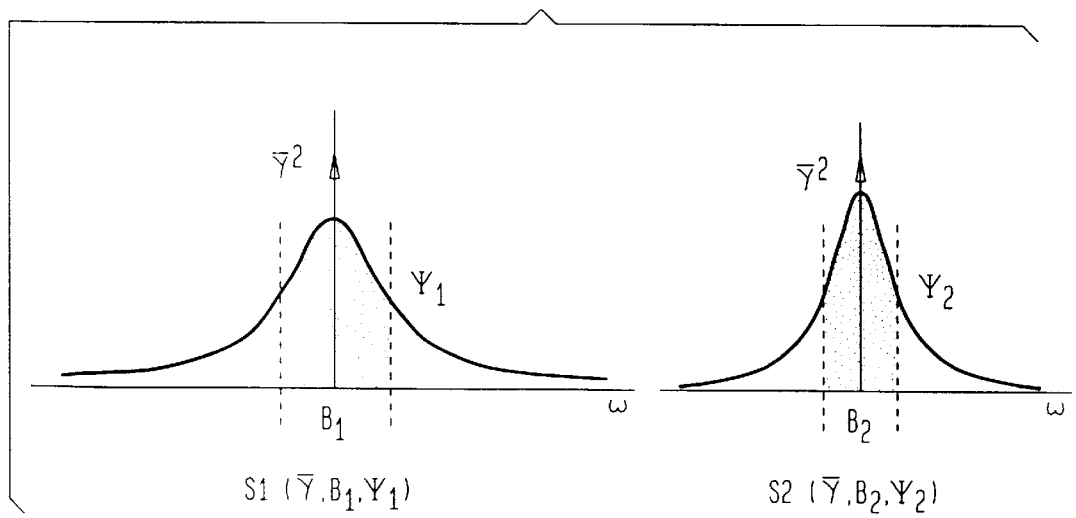
FIG. 4 shows a power spectrum plot of the bell function of the cell production rate of two different sources with the same QoS but different half power bandwidths and different average powers.
Figure 3:
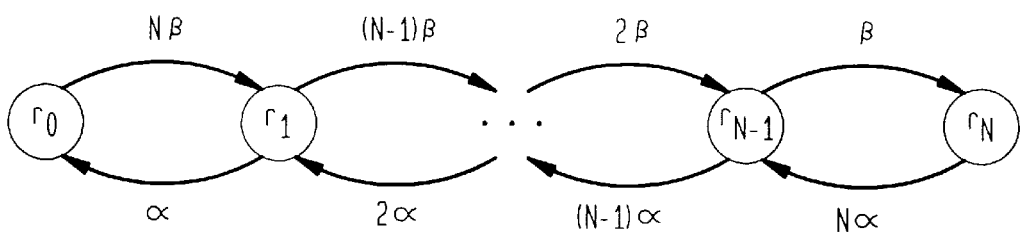
FIG. 3 shows an N+1 state Markov modulated Poisson process model.

To understand the simplification, consider first two sources, S1 and S2 with power spectrum parameters ($\bar{\gamma}$, $B_1$, $\Psi_1$) and ($\bar{\gamma}$, $B_2$, $\Psi_2$) as shown in FIG. 4. Assume that source S1 has the same QoS as source S2, but that $B_1$ is greater than $B_2$. Because $\bar{\gamma}$ is the same for the two sources S1 and S2, $\Psi_2$ must be less than $\Psi_1$. More generally stated, because of the symmetry of the bell function, given a source with power spectrum parameters ($\bar{\gamma}$, $B_w$, $\Psi_w$) it is possible to find another source with power spectrum parameters ($\bar{\gamma}$, $B_e$, $\Psi_e$) that will have the same QoS. Stated another way, a source with power spectrum parameters ($\bar{\gamma}$, $B_w$, $\Psi_w$) with any arbitrary value for parameter $B_w$ is equivalent, in terms of QoS, to a source with power spectrum parameters ($\bar{\gamma}$, $B_e$, $\Psi_e$) for a constant $B_e$. Of course, if $B_e$ is less than $B_w$, then $\Psi_e$ must be less than $\Psi_w$. Likewise, if $B_e$ is larger than $B_w$, then $\Psi_e$ will be greater than $\Psi_w$. Without loss of possibility, $B_e$ may be chosen to be a constant which is less than all expected values of $B_w$. In such a case, an arbitrary received set of power spectrum parameters ($\bar{\gamma}$, $B_w$, $\Psi_w$) can be transformed easily to power spectrum parameters ($\bar{\gamma}$, $B_e$, $\Psi_e$) (where $B_e$ is a constant) by a low pass filtering and integrating process. The low pass filter must be selected with an appropriate cut off frequency $\omega_c$, so that $\Psi_e$ may be obtained. The parameter $\Psi_e$ is given by $$\Psi_e = \frac{1}{2\pi}\int_{-\omega_c}^{+\omega_c} [P(\omega) - 2\pi\bar{\gamma}^2\delta(\omega) - \bar{\gamma}]d\omega. \quad (11)$$

If the source cell production rate is modeled by an MMPP with P ($\omega$), as described by $$R(\tau) = \bar{\gamma}\delta(\tau) + \psi_0 + \sum_{l=1}^{N}|\psi_l|e^{\mathrm{Re}\{\lambda_l\}|\tau|}\cos(\mathrm{Im}\{\lambda_l\}|\tau| + arg\{\Psi_l\}) \quad (4)$$

and $$P(\omega) = \bar{\gamma} + 2\pi\psi_0\delta(\omega) + \sum_{l=1}^{N} b_l(\omega)$$

$\Psi_e$ can further be expressed as $$\Psi_e = \frac{2}{\pi}\sum_{l=1}^{N}\psi_l\tan^{-1}\left(\frac{2\omega_c}{B_l}\right). \quad (12)$$

In short, given any arbitrary source having power spectrum parameters ($\bar{\gamma}$, $B_w$, $\Psi_w$), an equivalent source with an approximately identical QoS can be constructed with power spectrum parameters ($\bar{\gamma}$, $B_e$, $\Psi_e$), wherein $B_e$ is a predetermined constant and $\Psi_e$ is determined from Equations 11 and 12 above. For convenience, $\Psi_e$ is denoted the "equivalent average power" because it represents the equivalent average power of the bell shaped function with fixed half-power bandwidth $B_e$. The bell shaped function defined by ($\bar{\gamma}$, $B_e$, $\Psi_e$) is said to be the equivalent bell shaped function of the source with parameters ($\bar{\gamma}$, $B_w$, $\Psi_w$)

Figure 5:
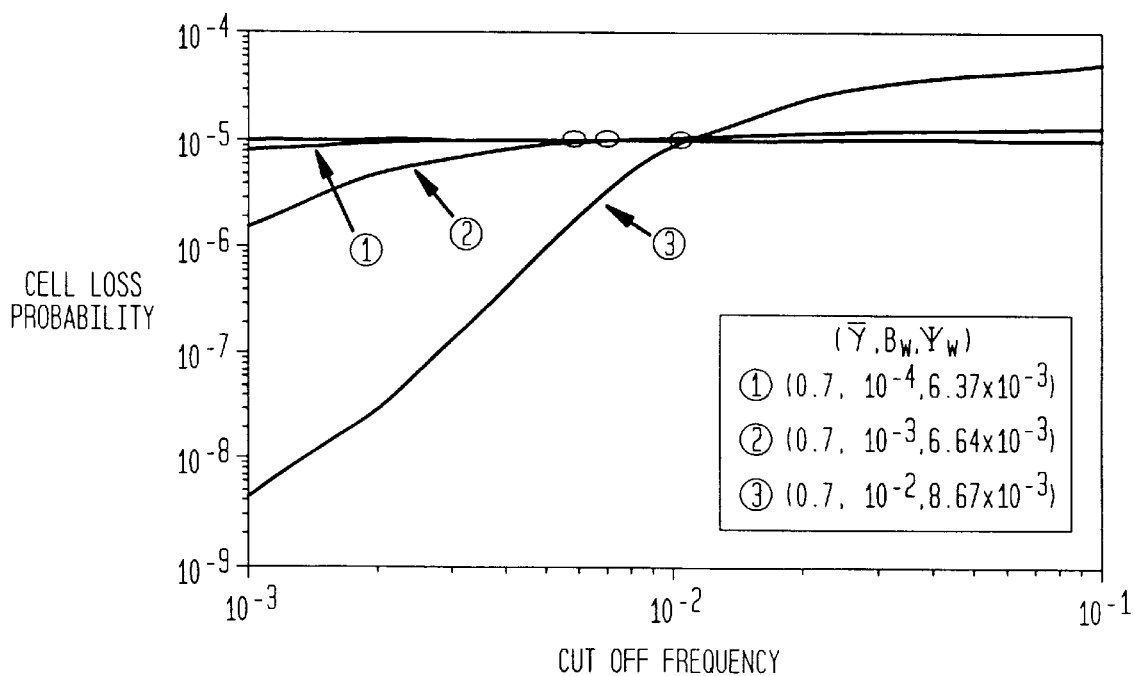
FIG. 5 shows a simulated effect of different cutoff frequencies on cell loss probability for purposes of deriving an optimal cutoff frequency.

In modeling the cell source production rates, the expected half power bandwidths $B_w$ of the cell production rates of the sources illustratively are presumed to be in the range of from $10^{-6}$ to $10^{-2}$. In such a case, $B_e$ may be set equal to $10^{-7}$ (so that it is less than all expected values of $B_w$). Next, a suitable cutoff frequency $\omega_c$ is chosen through simulation. FIG. 5 shows a plot of cell loss probability versus different cutoff frequencies $\omega_c$. In FIG. 5, the dashed line represents the desired QoS for the set of parameters ($\bar{\gamma}$, $B_w$, $\Psi_w$). The solid lines represent the approximated QoS achieved by low pass filtering with different cutoff frequencies. The intersection of the solid and dashed lines (where the desired QoS is approximately equal to the approximated QoS) is the optimal cutoff frequency $\omega_c$. Note that the approximate QoS is insensitive to the cutoff frequency for a source with $B_w$ less than $10^{-4}$. For sources with $B_w$ larger than $10^{-4}$, the approximate cell loss probability increases in relation to the cutoff frequency $\omega_c$. This is because the equivalent average power $\Psi_e$ increases with increasing cutoff frequency. Also note that the optimal cutoff frequency increases as $B_w$ increases. Therefore, the optimal cutoff frequency $\omega_c=10^{-2}$ (obtained from $B_w=10^{-2}$) illustratively is selected. The approximate QoS will be slightly overestimated for a source with $B_w$ less than $10^{-2}$. However, overestimation is a safe strategy to guarantee QoS in an ATM network.

Figure 6:
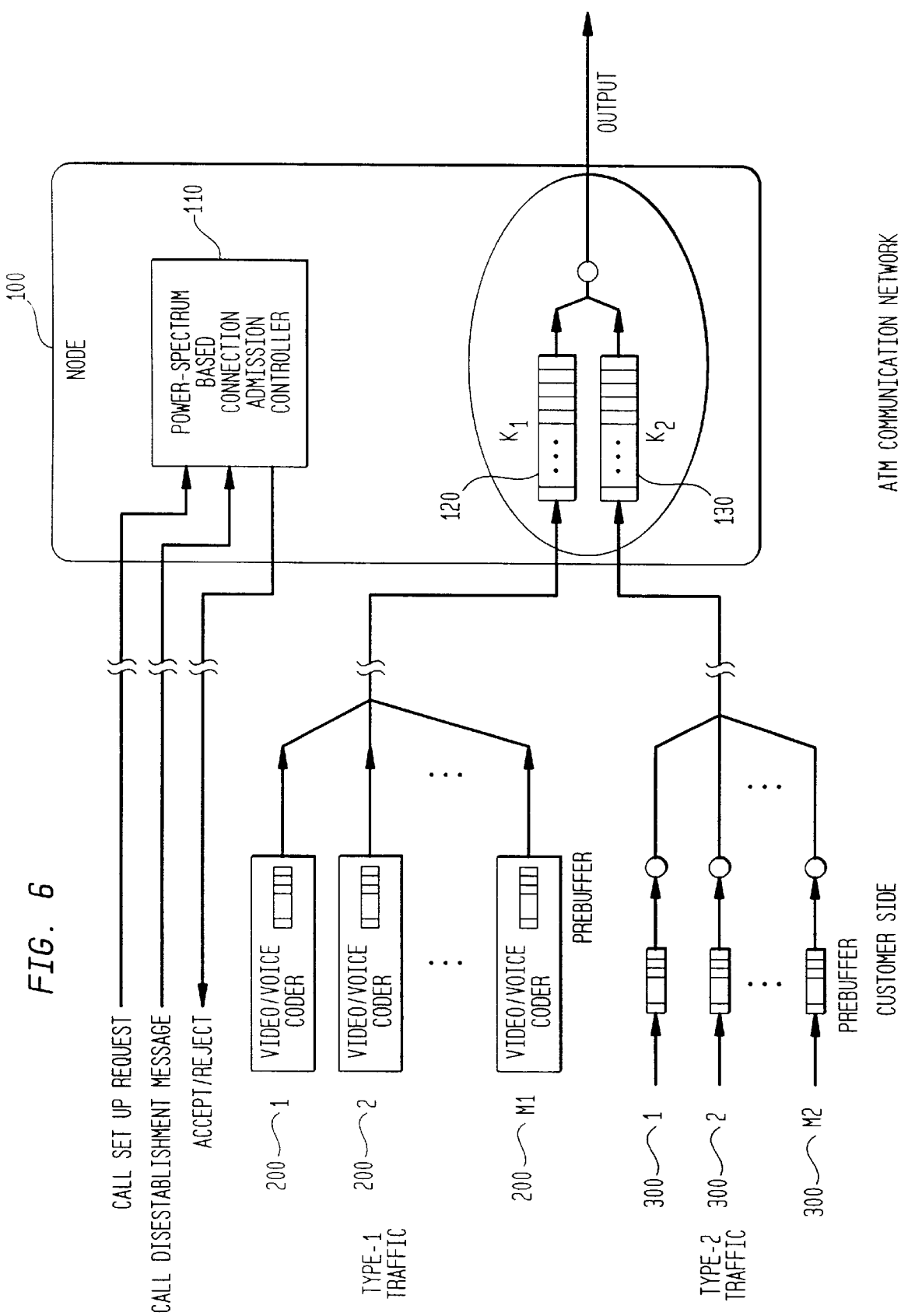
FIG. 6 shows a node according to an embodiment of the present invention.

Referring now to FIG. 6, a node 100 according to an embodiment of the present invention is depicted. In the illustration shown in FIG. 6, multiple sources 200-1, 200-2, ..., 200-M1 and 300-1, 300-2, ..., 300-M2 are present at one or more customer premises. The sources 200-1, ..., 200-M1 are streamed or continuous data sources for which data must be delivered in a timely fashion in order to maintain continuity of the communication. Cells produced for streamed communications by the sources 200-1, ..., 200-M1 are referred to herein as "type-1" traffic cells. Examples of such sources 200-1, ..., 200-M1 include video sources and voice sources. The sources 300-1, ..., 300-M2 are bursty or transactional data sources which generally do not have a specific time requirement for data delivery. Cells produced for transactional communications by the sources 300-1, ..., 300-M2 are referred to herein as "type-2" traffic cells.

Prior to communicating i.e., producing and outputting cells to the node 100, each source 200-1, ..., 200-M1, 300-1, ..., 300-M2 initiates the communication by transferring a call/connection setup request to the node 100. For a type-1 (streamed) communication, the call setup request illustratively specifies the mean bit rate $R_M$, the peak bit rate $R_P$ and the mean peak bit rate duration $T_D$ of the production of the cells of the streamed communication to be set up. For a type-2 (transactional) communication, the call setup request typically specifies the mean bit rate $R_M$ of the production of the cells of the transactional communication to be set up. These requests are received at a power spectrum based connection admission controller 110 of the node 100. In response, the power spectrum based connection admission controller 110 issues a signal indicating whether or not the call setup request has been accepted or rejected. If the call setup request is rejected, the sources 200-1, ..., 220-M1 or 300-1, ..., 300-M2 may submit an alternative request with different values for $R_M$, $R_P$, $T_D$. Alternatively, the call setup simply fails and no communication is established. On the other hand, if the call setup request is accepted, the source 200-1, ..., 200-M1 or 300-1, ..., 300-M2 produces cells and transmits them to the node 100. The produced cells are buffered in one or more queues 120 or 130 pending routing by the node 100 on an appropriate output link. For sake of illustration, type-1 and type-2 traffic are treated separately and the cells of each of traffic are buffered in separate queues 120, 130. That is, cells produced by the sources 200-1, ..., 200-M1 are enqueued into queue 120 having a length $K_1$ and cells produced by the sources 330-1, ..., 300-M2 are enqueued into the queue 130 having a length $K_2$.

The sources 200-1, ..., 200-M1 and 300-1, ..., 300-M2 produce cells at their various production rates for their respective communications until such communications end. When the communication ends, the source 200-1, ..., 200-M1 or 300-1, ..., 300-M2 for which the communication has ended ceases to produce cells and transmits a call disestablishment message to the power spectrum based connection admission controller 110. In response, the power spectrum based connection admission controller 110 deallocates resources previously allocated to the ending communication. In particular, the power spectrum based connection admission controller 110 releases the equivalent average power $\Psi_e$ and power spectrum DC component $\bar{\gamma}$ (or, as described below, arrival rate $\Gamma_{new}$, for a type-2 traffic source) that had been allocated to the ending communication thereby increasing the residual equivalent average power and residual power spectrum DC component (or residual arrival rate) of the node 100 that may be allocated to new calls or connections. This is described in greater detail below.

Figure 7:
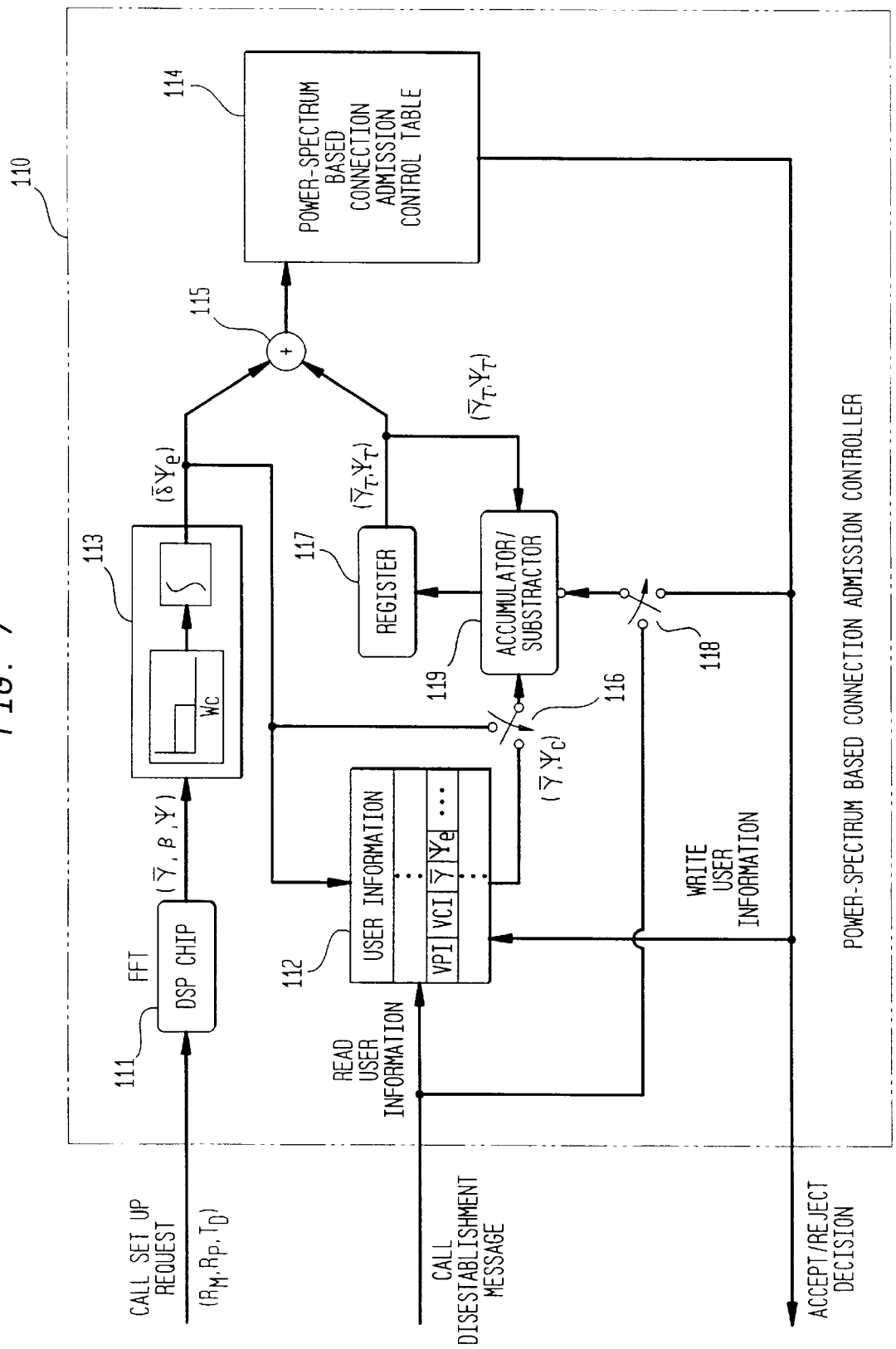
FIG. 7 shows a call admission controller according to an embodiment of the present invention.

Referring now to FIG. 7, the power spectrum based connection admission controller 110 is shown in greater detail. As shown, the parameters $R_M$, $R_P$ and $T_D$ of each type-1 communication call setup request may be received at a suitable circuit 111 such as a digital signal processing chip. Amongst other things, the circuit 111 converts the parameters $R_M$, $R_P$ and $T_D$ to a state transition matrix Q and a vector $\vec{\gamma}$ representing the arrival rate at each state of the transition matrix Q according to an MMPP. The circuit 111 furthermore produces the parameters $\bar{\gamma}$, $B_w$, and $\Psi_w$ in accordance with equations 1–10. The parameters $\bar{\gamma}$, $B_w$, and $\Psi_w$ are transformed to the parameters $\bar{\gamma}$, $B_e$, $\Psi_e$ (wherein $B_e$ is a predetermined constant) in circuit 113. As noted above, circuit 113 may be implemented as a low pass filter and integrator with a suitably selected cutoff frequency $\omega_c$. Alternatively, in the case of a type-2 call set up request, the circuit 111 simply converts the parameter $R_M$ to $\Gamma_{new}$ in accordance with the following equation:

$$\Gamma_{new}=R_M$$

The parameters $\bar{\gamma}$, $\Psi_e$ (or $\Gamma_{new}$) are outputted to a user information table 112 (which may be stored in a memory such as a RAM), a switch 116, and an adder 115. The parameters $\bar{\gamma}$, $\Psi_e$ (or $\Gamma_{new}$) are recorded in an entry of the user information table 112 which also contains identifiers for the particular call to which these parameters $\bar{\gamma}$, $\Psi_e$ (or $\Gamma_{new}$) correspond such as the virtual path identifier (VPI) and virtual channel identifier (VCI). As discussed in greater detail below, the recording of such an entry in the user information table 112 enables release of resources, in particular, power spectrum DC component $\bar{\gamma}$ and equivalent average power $\Psi_e$ (or arrival rate $\Gamma_{new}$) for reallocation to other calls or connections when a call or connection is disestablished.

A register or memory 117 is provided for storing the total aggregate power spectrum DC component $\bar{\gamma}_T$ and the total aggregate average power $\Psi_T$ currently allocated to all type-1 calls or connections that are currently admitted to the node 100. Likewise, the register 117 also stores the total aggregate arrival rate $\Gamma_T$ currently allocated to all type-2 calls or connections that are currently admitted to the node 100. These aggregate parameters $\bar{\gamma}_T$, $\Psi_T$ and $\Gamma_T$ are outputted to an adder 115 where they are added to the parameters $\bar{\gamma}$, $\Psi_e$ and $\Gamma_{new}$ produced by the circuit 113 for the call setup request. Note that only $\bar{\gamma}$ and $\Psi_e$ are produced for a type-1 call set up request ($\Gamma_{new}$ is set to zero in this case) and only $\Gamma_{new}$ is produced for a type-2 call set up request (both $\bar{\gamma}$ and $\Psi_e$ are set to zero in this case). The adder 115 produces a new aggregate power spectrum DC component $\bar{\gamma}_T{}'$, a new aggregate average power $\Psi_T{}'$ and a new aggregate arrival rate $\Gamma_T{}'$. The new parameters $\bar{\gamma}_T{}'$, $\Psi_T{}'$ and $\Gamma_T{}'$ are outputted to a power spectrum based connection admission control table 114 (which may be stored in a memory such as a RAM). In response, the power spectrum based admission control table 114 outputs an indication as to whether or not the call request is accepted or rejected. The manner in which the power spectrum based admission control table generates the acceptance or rejection indication from the inputted parameters $\bar{\gamma}_T'$, $\Psi_T'$ and $\Gamma_T'$ is described in greater detail below.

The acceptance/rejection indication is outputted from the power spectrum based connection admission controller 110 to the source which issued the call setup request. The indication is also outputted as an enabling signal to the table 112. If the call is rejected, the table 112 is disabled from storing an entry for the requested call. On the other hand, if the call is accepted, the table 112 is enabled to store an entry for the requested call. Likewise, the signal 114 is outputted to the switch 118. In the event that the power spectrum based connection admission controller 110 is processing a call setup request, the switch 118 connects the accept\reject decision indication outputted from the table 114 as an enable signal for an accumulator\subtractor 119. Likewise, the switch 116 is connected to receive the parameters $\bar{\gamma}$, $\Psi_e$ and $\Gamma_{new}$ outputted from the circuit 113 while processing a call setup request. If the call is rejected, the accumulator\subtractor 119 is disabled and the value stored in the register 117 is not changed. If, on the other hand, the indication outputted from the table 114 indicates that the call was accepted, the accumulator\subtractor 119 is enabled. The accumulator\subtractor 119 receives the parameters $\bar{\gamma}$, $\Psi_e$ and $\Gamma_{new}$ outputted from the circuit 113 and adds them to the aggregate parameters $\bar{\gamma}_T$, $\Psi_T$, $\Gamma_T$, respectively, currently stored in the register 117. Thus, when a call is accepted, the aggregate parameters $\bar{\gamma}_T$, $\Psi_T$ and $\Gamma_T$ are updated to reflect the admission of the new call or connection.

When a source, such as the source 200-1, . . . , 200-M1 or 300-1, . . . , 300-M2, desires to end a communication, it transmits a call disestablishment message to the power spectrum based connection admission controller 110. The call disestablishment message contains one or more identifiers which identify the call to be disestablished. For example, the call disestablishment message may include the VPI and VCI of the to-be-disestablished call. Upon receiving the call disestablishment message, the power spectrum based connection admission controller 10 throws the switches 116 and 118 such that the switch 118 is connected to an enabling signal of the call disestablishment message and such that the switch 116 receives the output of the table 112. In response to the VPI and VCI of the call disestablishment message, the table 112 retrieves the entry corresponding thereto for output. In particular, if the to-be disestablished call is a type-1 traffic call, the parameters $\bar{\gamma}$ and $\Psi_e$ corresponding to the to-be-disestablished call are retrieved and outputted to the accumulator\subtractor 119. The enabling signal from the call disestablishment message causes the accumulator\subtractor 119 to subtract the value $\bar{\gamma}$ outputted from the table 112 from the parameter $\bar{\gamma}_T$ currently stored in the register 117 and to subtract the value $\Psi_e$ outputted from the table 112 from the parameter $\Psi_T$ also currently stored in the register 117. Alternatively, if the to-be-disestablished call is a type-2 traffic call, the parameter $\Gamma_{new}$ corresponding to the to-be-disestablished call is retrieved and outputted to the accumulator/subtractor 119. The enabling signal from the call disestablishment message causes the accumulator\subtractor 119 to subtract the value $\Gamma_{new}$ outputted from the table 112 from the parameter $\Gamma_T$ currently stored in the register 117. The differences thus produced by the accumulator\subtractor 119 are then stored in the register 117 as the new values of $\bar{\gamma}_T$, $\Psi_T$ and $\Gamma_T$. Thus, the aggregate parameters $\bar{\gamma}_T$, $\Psi_T$ and $\Gamma_T$ are updated to reflect the release of resources $\bar{\gamma}$ and $\Psi_e$ of a type-1 traffic disestablished call or the resource $\Gamma_{new}$ of a type-2 traffic disestablished call.

The construction of the power based connection admission control table 114 is now described in greater detail. Assume that the service time for each cell is constant and equal to some slot time $\Delta t$. Furthermore, assume that a "queue-length-threshold" (QLT) scheduling policy is using to select cells for output from the queue 120 or the queue 130. See, R. Chipalkatatti, J. F. Kurose & D. Towsley, Scheduling Policies for Real-Time and Non-Real-Time Traffic in a Statistical Multiplexer, IEEE INFOCOM '89, pp.774–783. According to such a policy, if the queue length of the buffer 130 is greater than or equal to $\xi$, priority is given to outputting cells from the buffer 130. Otherwise, priority is given to outputting cells from the buffer 120.

Based on the above-described QLT scheduling model, a connection admission control table is constructed as follows. Let $\bar{\gamma}_T$ be the aggregate power spectrum DC component of the mean cell production rate of type-1 traffic and let $\Gamma_T$ be the aggregate power spectrum DC component of the cell arrival rate of type-2 traffic. The parameters $\bar{\gamma}_T$ and $\Gamma_T$ represent the type-1 and type-2 traffic loads respectively. Let $\Psi_{max}(\bar{\gamma}_T, \Gamma_T)$ be the maximum aggregate equivalent average power of cell production of all calls that can be accommodated by the node 100 given type-1 and type-2 traffic loads as represented by $\bar{\gamma}_T$ and $\Gamma_T$. The QoS will be guaranteed if the aggregate equivalent average power $\Psi_T$ of all currently admitted calls and the new call for which a request has been submitted is less than the maximum aggregate equivalent average power $\Psi_{max}(\bar{\gamma}_T, \Gamma_T)$ for the given loads $\bar{\gamma}_T$, $\Gamma_T$. The following steps are then performed in constructing the connection admission control table 114:

Step 1: Finding the maximum acceptable type 2 load $\Gamma_{max}$
Using a single queue model, wherein only type-2 traffic cells are stored in a single queue and only cells from that single queue are to be outputted by the node, determine the maximum aggregate type-2 traffic cell arrival rate $\Gamma_{max}$ for a given QoS requirement. The QoS requirement may be expressed as a maximum threshold cell loss probability. In the single queue model, it is assumed that type-2 traffic cells will only be outputted from the queue when the queue length is greater than or equal to $\xi$. Such an estimation process is well known and is described in C. H. Lin, Traffic Control for an ATM Network Using Spectral Analysis, Master Thesis, Department of Communication Engineering, National Chiao Tung University (1994).

Step 2: Finding the maximum aggregate equivalent average power $\Psi_{max}(\bar{\gamma}_T, \Gamma_T)$
(i) Initially set $\Gamma_T=0$ and $\bar{\gamma}_T=\Delta\gamma$ where $\Delta\gamma$ is a predetermined power spectrum DC component increment.
(ii) Using the above-noted QLT scheduling policy, find $\Psi_{max}(\bar{\gamma}_T, \Gamma_T)$ that satisfies a given QoS requirement of the type-1 traffic for type-1 and type-2 traffic loads $\bar{\gamma}_T$ and $\Gamma_T$. The QoS requirement may be specified as a maximum threshold cell loss probability, a maximum threshold cell delay, and\or a maximum tolerable cell delay variation. Such a value for $\Psi_{max}$ can be easily determined through simulation. See C. H. Lin, Traffic Control for an ATM Network Using Spectral Analysis, Master Thesis, Department of Communication Engineering, National Chiao Tung University (1994). The value of $\Psi_{max}(\bar{\gamma}_T, \Gamma_T)$ is stored in the power spectrum based connection admission control table 114 in an entry that is cross indexed by $\bar{\gamma}_T$ and $\Gamma_T$.
(iii) Increase $\bar{\gamma}_T$ by a predetermined unit step size $\Delta\gamma$ and repeat sub-step (ii) until $\bar{\gamma}_T=1$.
(iv) Increase $\Gamma_T$ by a predetermined unit step size $\Delta\Gamma_T$ and reset $\bar{\gamma}_T=\Delta\gamma$.

Repeat sub-steps (ii)–(iii) until $\Gamma_T = \Gamma_{max}$.

The above process for generating the power spectrum based connection admission control table 114 is preferably preliminarily performed "off-line" using a processor and suitable memory. Once the table 114 is completed, it is stored in a suitable memory of the node 100.

The generation of the acceptance/rejection indication by the power spectrum based admission control table 114 (FIG. 7) from the parameters $\bar{\gamma}_T'$, $\Psi_T'$ and $\Gamma_T'$ outputted from the adder 115 is now described. Whenever a type-1 traffic call request is received, the values of $\bar{\gamma}$ and $\Psi_e$ are determined (as noted above by transforming $\bar{\gamma}$, $B_w$, $\Psi_w$, to $\bar{\gamma}$, $B_e$, $\Psi_e$, where $B_e$ is a predetermined constant). The type-1 aggregate power spectrum DC component $\bar{\gamma}_T$ and the aggregate average power $\Psi_T$ are respectively increased by $\bar{\gamma}$ and $\Psi_e$ to reflect the changes in traffic parameters assuming that the requested call is admitted, i.e., $\bar{\gamma}_T'$ is set equal to $\bar{\gamma}_T + \bar{\gamma}$ and $\Psi_T'$ is set equal to $\Psi_T + \Psi_e$ (and $\Gamma_T'$ is set equal to $\Gamma_T + 0$). The power spectrum based connection admission control table 114 is then accessed to retrieve $\Psi_{max}(\bar{\gamma}_T', \Gamma_T')$. If $\Psi_{max}$ is greater than $\Psi_T'$, then the proposed increase in the type-1 traffic load $\bar{\gamma}_T'$ for the existing type-2 traffic load $\Gamma_T'$ can be accommodated while still maintaining the QoS. In such a case, a call accept indication is outputted from the power spectrum based connection admission control table 114. If $\Psi_{max}(\bar{\gamma}_T', \Gamma_T')$ is not greater than $\Psi'_T$, then the proposed call cannot be accommodated while still maintaining the QoS and a rejection indication is outputted from the power spectrum based connection admission control table 114.

Likewise, when a new type-2 call request is received, the aggregate cell arrival rate of all type-2 traffic $\Gamma_T$ accommodated by the node 100 is updated by the arrival rate of the new type-2 call $\Gamma_{new}$, i.e., $\Gamma_T'$ is set equal to $\Gamma_T + \Gamma_{new}$ (likewise, $\bar{\gamma}T$ is set equal to $\bar{\gamma}_T + 0$ and $\Psi_T'$ is set equal to $\Psi_T + 0$). If $\Gamma_T'$ is less than $\Gamma_{max}$, then the QoS of the type-2 traffic can be maintained. It is then only necessary to ensure that the QoS can be maintained for the type-1 traffic. If $\Gamma_T'$ is not less than $\Gamma_{max}$, then QoS cannot even be maintained for type-2 traffic and the power spectrum based connection admission control table 114 outputs a rejection indication. Assume that $\Gamma_T'$ is less than $\Gamma_{max}$. In such a case, the value of $\Psi_{max}(\bar{\gamma}_T', \Gamma_T')$ indexed by the type-1 and type-2 traffic load parameters $\bar{\gamma}_T'$ and $\Gamma_T'$ is retieved. If $\Psi_{max}(\bar{\gamma}_T', \Gamma_T')$ is greater than $\Psi_T'$, then the type-2 traffic call may be accommodated and the QoS for the type-1 traffic can still be maintained. In such a case, the power spectrum based connection admission control table 114 outputs an accept indication. Otherwise, the power spectrum based connection admission control table 114 outputs a rejection indication.

Note that the illustration herein assumes that transactional data communications are to be accommodated in addition to streamed data communications. If only streamed data communications are to be accommodated, the power spectrum based admissions control table may be generated by storing values of $\Psi_{max}(\bar{\gamma}_T)$ that depend only on the type-1 traffic load parameter $\bar{\gamma}_T$. In any event, note the dramatic reduction in the size of the power spectrum based admission control table 114 that results by the conversion of parameters ($\bar{\gamma}$, $B_w$, and $\Psi_w$) to ($\bar{\gamma}$, $B_e$, and $\Psi_e$). In particular, because $B_e$ is constant for each call set up request, $\Psi_{max}$ is a function of only $\bar{\gamma}$ and not both $\bar{\gamma}$ and $B_e$. Stated another way, $\Psi_{max}$ only varies for differing values of $\bar{\gamma}$ as there is only one possible value of $B_e$ for each call setup request. Thus, table entries need only be provided for each value of one parameter, namely, $\bar{\gamma}$ and not one for each possible pair of two varying parameters both $\bar{\gamma}$ and $B_e$.

Figure 8:
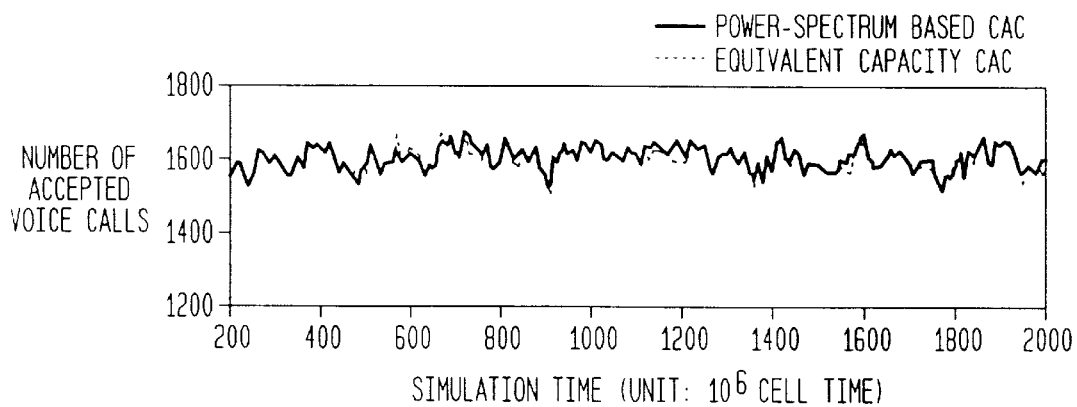
FIG. 8 shows a graph of the number of voice calls admitted with respect to time.
Figure 9:
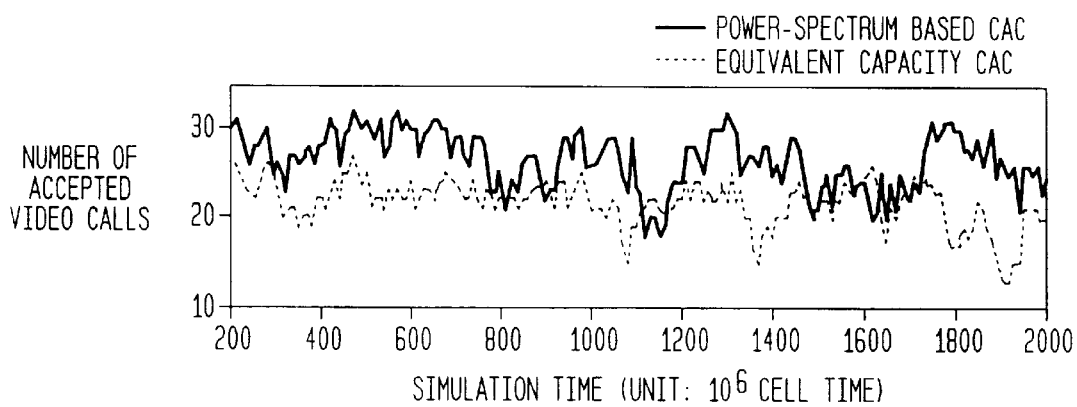
FIG. 9 shows a graph of the number of video calls admitted with respect to time.
Figure 10:
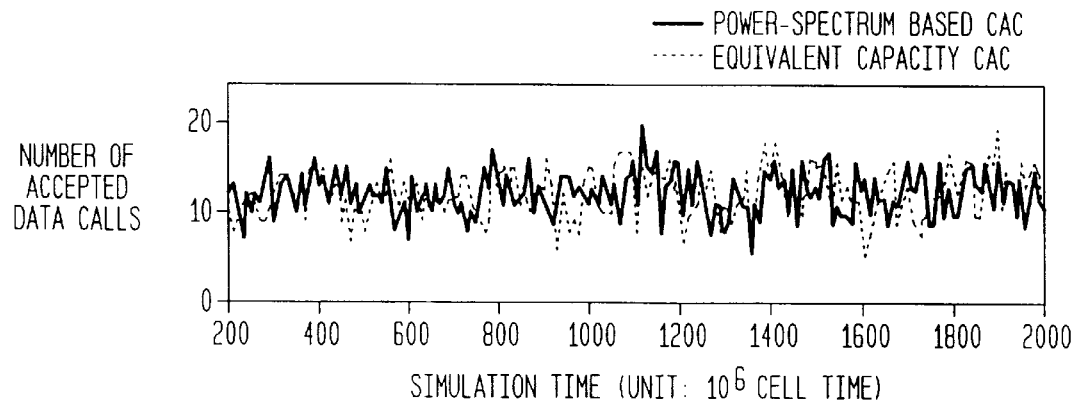
FIG. 10 shows a graph of the number of data calls admitted with respect to time.
Figure 11:
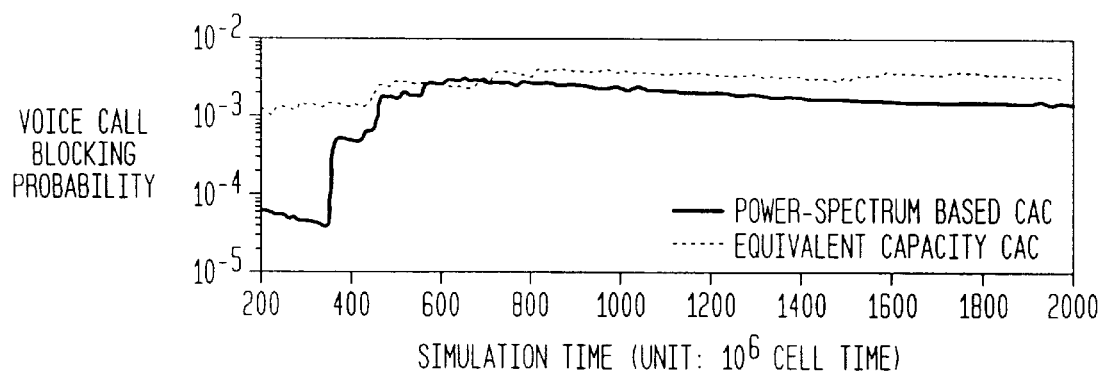
FIG. 11 shows a graph of the probability that a voice call is blocked with respect to time.
Figure 12:
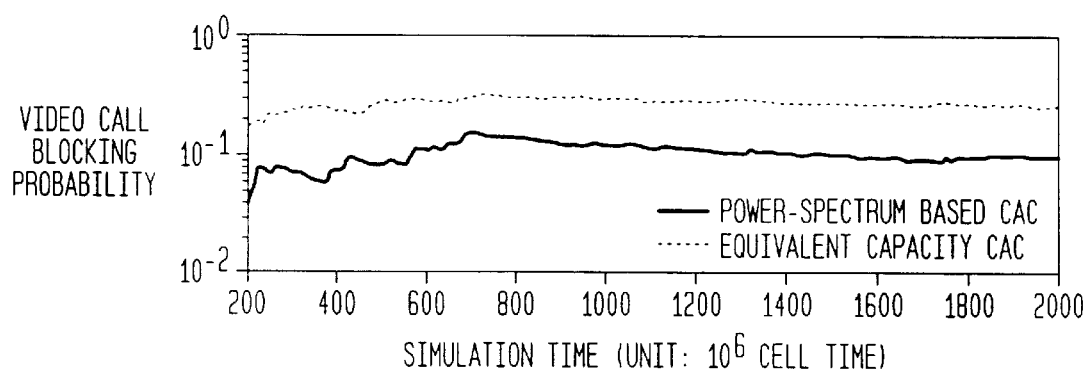
FIG. 12 shows a graph of the probability that a video call is blocked with respect to time.
Figure 13:
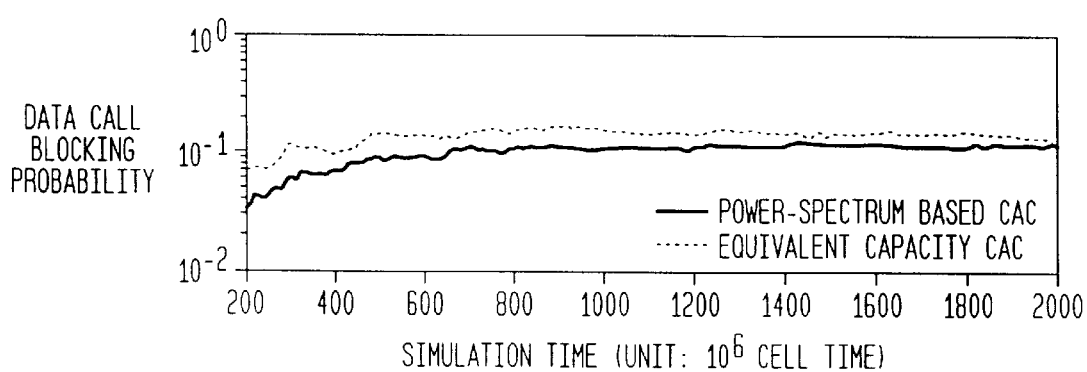
FIG. 13 shows a graph of the probability that a data call is blocked with respect to time.
Figure 14:
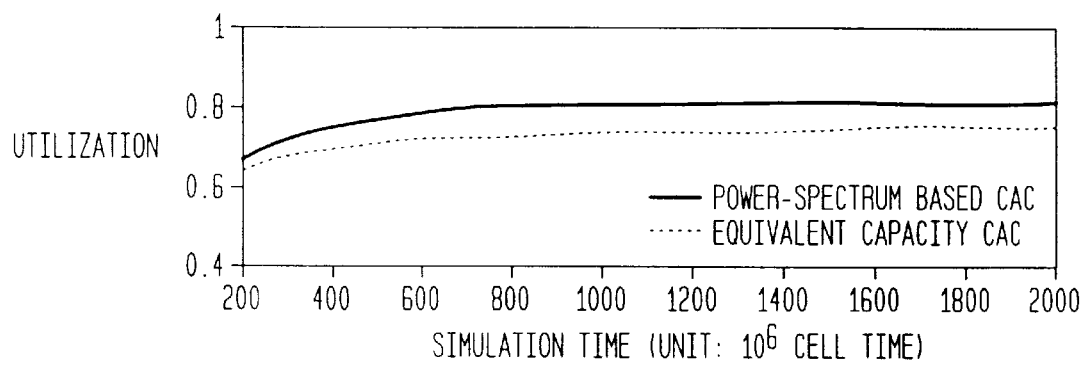
FIG. 14 shows a graph of bandwidth utilization with respect to time.
Figure 15:
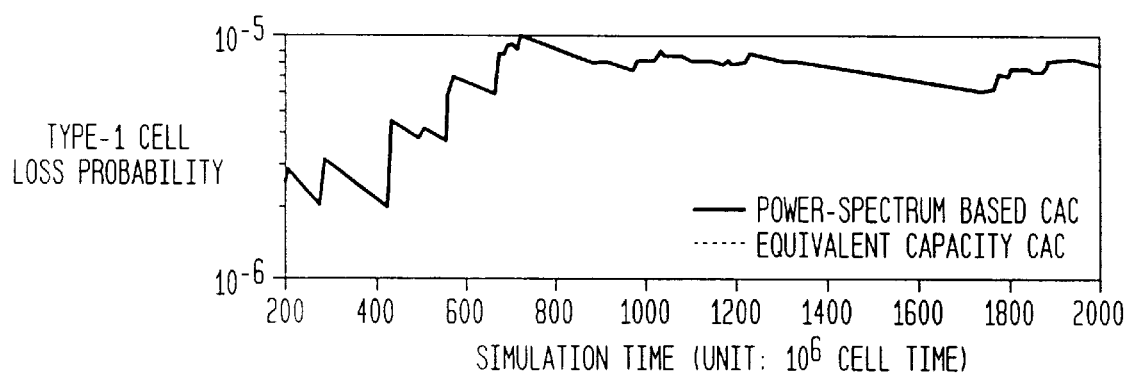
FIG. 15 shows a graph of type-1 traffic cell loss probability with respect to time.
Figure 16:
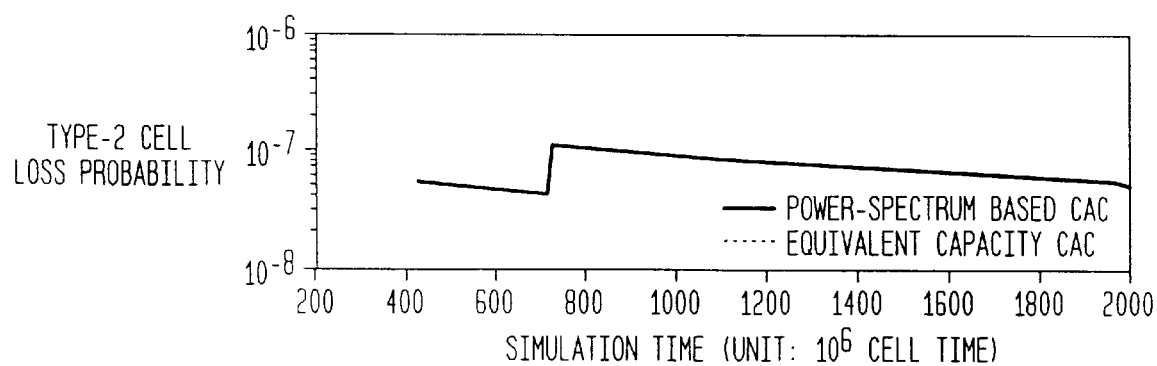
FIG. 16 shows a graph of type-2 traffic cell loss probability with respect to time.

FIGS. 8–16 show the results of a simulation using a system according to the present invention. In FIGS. 8–16, the simulated results produced according to the invention are compared the equivalent capacity technique proposed by Guèrin. FIG. 8 plots the number of voice calls admitted as a function of time. FIG. 9 plots the number of video calls that are accepted as a function of time. FIG. 10 plots the number of data calls that are accepted as a function of time. FIG. 11 plots the probability that a voice call is blocked as a function of time. FIG. 12 plots the probability that a video call is blocked as a function of time. FIG. 13 plots the probability that a data call is blocked as function of time. FIG. 14 plots bandwidth utilization as a function of time. FIG. 15 plots the cell loss probability of type-1 traffic cells as a function of time. FIG. 16 plots the type-2 traffic cell loss probability as a function of time. In the simulations, $B_e$ is set equal to $10^{-7}$ and $\omega_c$ is set equal to $10^{-2}$. The size of the type-1 traffic queue 120 is K1=100 and the size of the type-2 traffic queue is K2=100. The QLT scheduling policy is used wherein $\xi$=80. When the queue length of the type-2 traffic queue 130 exceeds $\xi$, a portion $\rho$=0.2 of the capacity is reserved to type-2 traffic and the remaining (1-$\rho$) or 0.8 portion of the capacity is first allocated to type-1 traffic. Otherwise, priority is always given to type-1 traffic. The link capacity is assumed to be 135.8 Mbits/sec and each cell is assumed to have 53 bytes with a 5 byte header. The QoS requirement defined in terms of cell loss probability is set to $10^{-5}$ for type-1 traffic and $10^{-6}$ for type-2 traffic. The voice source is modeled by a 2 state on-off Markov chain and a video source is modeled by a MMPP. The arrival rate of cells of the data source is assumed to be Poisson distributed. The mean holding time of voice and video cells is assumed to be exponentially distributed. The arrivals of call setup requests are assumed to be independently Poisson distributed. The system in the simulation was assumed to accept voice, video and data calls. The mean rate $R_M$ of a data call was assumed to be 1.358 Mbits/sec. The call setup request arrival rate for the data call was assumed to be 0.4667 calls per second with mean holding time of 30 seconds. The call setup request arrival for voice was 26.662 calls per second with mean holding time of one minute. The call arrival rate for video was 0.10014 calls per second with a mean holding time of five minutes.

Referring to FIG. 8, note that the system according to the present invention admits a comparable number of voice calls as a system using the equivalent capacity system. Likewise, as shown in FIG. 10, both the system according to the present invention and the equivalent capacity system admit comparable numbers of data calls. However, as noted in FIG. 9, the system according to the present invention accommodates more video calls than the equivalent capacity system. Note also that the system according to the present invention has a lower call blocking probability for voice, video and data calls than a system using the equivalent capacity method as shown in FIGS. 11, 12 and 13. Moreover, as shown in FIG. 14, the system according to the present invention provides a higher utilization of bandwidth by an amount of approximately 7% than a system using the equivalent capacity method. As noted in FIGS. 15 and 16, the cell loss probability of type-1 and type-2 traffic is satisfied for both the system according to the present invention and the equivalent capacity method system.

Conclusion

In short, a power spectrum based connection admission control method and system are disclosed. The time based parameters specified in a call admission request are converted to frequency domain parameters, power spectrum DC component $\bar{\gamma}$, half power bandwidth $B_w$, and average power $\Psi_w$. The parameters $\bar{\gamma}$, $B_w$ and $\Psi_w$ are transformed to the parameters $\bar{\gamma}$, $B_e$ and $\Psi_e$ wherein $B_e$ is a predefined constant half power bandwidth. Such transformation may be a simple low pass filtering and integrating process on $\Psi_w$ to produce $\Psi_e$ with suitable selection of $B_e$ and low pass filter cutoff frequency $\omega_c$. The transform parameters $\bar{\gamma}$, $\Psi_e$ may be added to aggregate parameters $\bar{\gamma}_T$ and $\Psi_T$ to produce the aggregate power spectrum DC component $\bar{\gamma}_T$ and the aggregate average power $\Psi_T$ for all currently admitted calls and the newly requested call. The parameter $\bar{\gamma}_T$ may be used to access a power spectrum based connection admission control table. In particular, at least the parameter $\bar{\gamma}_T$ may be used as an index to retrieve a maximum acceptable aggregate average power $\Psi_{max}$ that can be accommodated by the node given the value $\bar{\gamma}_T$ that still maintains an acceptable QoS. If $\Psi_{max}$ is greater than $\Psi_T$, the newly requested call is accepted. Otherwise, the newly requested is rejected. According to the invention, the transformation from $\bar{\gamma}$, $B_w$, $\Psi_w$ to $\bar{\gamma}$, $B_e$, $\Psi_e$, where $B_e$ is a predetermined constant, reduces the number of indexing parameters needed to access the power spectrum based connection admission control table by one parameter. This dramatically reduces the size of the power spectrum based connection admission control table.

Finally, the above-discussion is intended to be merely illustrative of the invention. Numerous alternative embodiments may be devised by those having ordinary skill in the art without departing from the spirit and scope of the following claims.

The invention claimed is:

1. A method for constructing a power spectrum based connection admission control table including the steps of:
   (a) using a predetermined scheduling policy and a predetermined quality of service for communications, determining a maximum equivalent aggregate average power $\Psi_{max}$ of an arrival rate of cells for all calls admitted to a node, which maintains said predetermined quality of service, as a function of at least an aggregate power spectrum DC component $\bar{\gamma}_T$ but not as a function of a constant equivalent half-power bandwidth $B_e$ of said arrival rate of cells for all calls, for which $B_e$ individual component equivalent average powers $\Psi_e$ are determined for all calls,
   (b) storing the value of $\Psi_{max}$ determined in step (a) in a table entry that is indexed by at least the value of $\bar{\gamma}_T$ used to determined said stored value of $\Psi_{max}$, and
   (c) repeating steps (a)–(b) for multiple different values of $\bar{\gamma}_T$ in a range of expected values for $\bar{\gamma}_T$.

2. The method of claim 1 further comprising the step of using a queue-least threshold scheduling policy.

3. The method of claim 1 wherein said step (a) further comprises the step of determining said constant $B_e$ as a value less than each expected half power bandwidth value $B_w$ of each call set up request.

4. The method of claim 1 wherein said connection admission control table is used to admit type-1 traffic calls for streamed communications and type-2 traffic calls for transactional communications, wherein received type-1 traffic cells of admitted calls are buffered in said node in a separate queue from received type-2 traffic cells until said admitted cells are routed onto an outgoing link from said node, said method further comprising the steps of:
   (d) prior to performing step (a), determining a maximum aggregate cell arrival rate $\Gamma_{max}$ of all type-2 traffic calls that can be accommodated by said node, and
   (e) repeating steps (a)–(c) for same multiple values of $\bar{\gamma}_T$ once for each of multiple different values of an aggregate cell arrival rate $\Gamma_T$ for all admitted type-2 traffic calls between 0 and $\Gamma_{max}$, wherein said step (a) comprises determining $\Psi_{max}$ as a function of a value of $\Gamma_T$ for admitted type-2 traffic calls as well as said value of $\bar{\gamma}_T$ for admitted type-1 traffic calls, wherein said step (b) comprises storing said value $\Psi_{max}$ in a table entry that is indexed by said value of $\Gamma_T$ as well as said value of $\bar{\gamma}_T$ used to determine said value of $\Psi_{max}$ in said step (a).

5. A method for admitting calls using a power spectrum based connection admission control table comprising the steps of:
   (a) producing power spectrum DC component $\bar{\gamma}$, half power bandwidth $B_w$, and average power $\Psi_w$ parameters of a cell arrival rate of a new call,
   (b) transforming the three parameters $\bar{\gamma}$, $B_w$, $\Psi_w$ to two parameters $\bar{\gamma}$ and an equivalent average power $\Psi_e$, for a predetermined constant $B_e$,
   (c) retrieving from a predetermined table, a maximum aggregate equivalent average power $\Psi_{max}$ that can be accommodated by a node for all admitted calls which $\Psi_{max}$ is indexed by at least a sum of an aggregate power spectrum DC component $\bar{\gamma}_T$ for all calls currently admitted at said node and $\bar{\gamma}$, and
   (d) determining whether or not to admit said new call by comparing a sum of an aggregate average power $\Psi_T$ of all calls currently admitted to said node and $\Psi_e$ to $\Psi_{max}$.

6. The method for claim 5 further comprising the steps of:
   (e) receiving in a call set up request from a cell source one or more parameters of said cell arrival rate in the time domain, and
   (f) transforming the time domain parameters to the frequency domain to produce said parameters $\bar{\gamma}$, $B_w$, $\Psi_w$.

7. The method of claim 5 wherein said constant $B_e$ is selected so as to be less than each expected value of $B_w$, said method further comprising the step of:
   (e) low pass filtering and integrating $\Psi_w$ to produce $\Psi_e$.

8. The method of claim 5 further comprising the step of: in response to admitting a call to said node:
   (e) increasing $\bar{\gamma}_T$ and $\Psi_T$ by the values $\bar{\gamma}$ and $\Psi_e$ of said admitted call, and
   (f) storing in a second table entry said values of $\bar{\gamma}$ and $\Psi_e$ of said admitted call if there is at least one said admitted call.

9. The method of claim 8 further comprising the step of: in response to disestablishing a call previously admitted to said node:
   (g) retrieving said parameters $\bar{\gamma}$ and $\Psi_e$ of the disestablished call, and
   (h) reducing $\bar{\gamma}_T$ and $\Psi_T$ by the retrieved values of $\bar{\gamma}$ and $\Psi_e$ from step (g).

10. The method of claim 5 wherein said node admits both type-1 traffic calls for streamed communications and type-2 traffic calls for transactional communications, said method further comprising the steps of:
   (e) maintaining an aggregate cell arrival rate parameter $\Gamma_{max}$ of all type-2 traffic calls admitted to said node and said parameters $\bar{\gamma}_T$ and $\Psi_T$ for all type-1 traffic calls admitted to said node, wherein said step (c) further comprises the step of using a value $\Gamma_{max}$ as well as the sum of $\bar{\gamma}_T$ and $\bar{\gamma}$ to retrieve $\Psi_{max}$ for determining whether or not to admit a type-1 traffic call, where said value $\Gamma_{max}$ being a maximum aggregate cell arrival rate.

11. The method of claim 10 further comprising the steps of:

admitting a new type-2 traffic call by:

(f) receiving a cell arrival rate $\Gamma_{new}$ for said admitted type-2 traffic call, (g) retrieving from said predetermined table a value of $\Psi_{max}$ contained in a table entry indexed by the sum of $\Gamma_T$ and $\Gamma_{new}$ and $\bar{\gamma}_T$, and (h) determining whether or not to admit said new type-2 traffic call by comparing a sum of $\Gamma_T$ and $\Gamma_{new}$ to a maximum aggregate cell arrival rate for type-2 traffic calls $\Gamma_{max}$ and by comparing $\Psi_T$ to the value of $\Psi_{max}$ retrieved in said step (g).

12. An apparatus for constructing a power spectrum based connection admission control table comprising:

a processor for, using a predetermined scheduling policy and a predetermined quality of service for communications, determining a maximum equivalent aggregate average power $\Psi_{max}$ of an arrival rate of cells for all calls admitted to a node, which maintains said predetermined quality of service, as a function of at least an aggregate power spectrum DC component $\bar{\gamma}_T$ but not as a function of a constant equivalent half-power bandwidth $B_e$ of said arrival rate of cells for all calls, for which $B_e$ individual component equivalent average powers $\Psi_e$ are determined for all calls, and a memory for storing each value of $\Psi_{max}$ determined by said processor in a table entry that is indexed by at least the value of $\bar{\gamma}_T$ used by said processor to determined said stored value of $\Psi_{max}$, and wherein said processor determines a value of $\Psi_{max}$ for multiple different values of $\bar{\gamma}_T$ in a range of expected values for $\bar{\gamma}_T$.

13. The apparatus of claim 12 wherein said processor uses a queue-least-threshold scheduling policy.

14. The apparatus of claim 12 wherein said processor determines said constant $B_e$ as a value less than each expected half power bandwidth value $B_w$ of each call set up request.

15. The apparatus of claim 12 wherein said table stored in said memory is used to admit type-1 traffic calls for streamed communications and type-2 traffic calls for transactional communications, wherein received type-1 traffic cells of admitted calls are buffered in said node in a separate queue from received type-2 traffic cells until said admitted cells are routed onto an outgoing link from said node, wherein prior to determining $\Psi_{max}$, said processor determines a maximum aggregate cell arrival rate $\Gamma_{max}$ of all type-2 traffic calls that can be accommodated by said node, wherein said processor determines $\Psi_{max}$ for the same multiple values of $\bar{\gamma}_T$ once for each of multiple different values, between 0 and $\Gamma_{max}$, of an aggregate cell arrival rate $\Gamma_T$ for all admitted type-2 traffic calls, wherein said processor determines $\Psi_{max}$ as a function of a value of $\Gamma_T$ for admitted type-2 traffic calls as well as said value of $\bar{\gamma}_T$ for admitted type-1 traffic calls, and wherein said memory stores said value $\Psi_{max}$ in a table entry that is indexed by said value of $\Gamma_T$ as well as said value of $\bar{\gamma}_T$ used to determine said value of $\Psi_{max}$.

16. A node in a communications network comprising:

(a) a first circuit for producing power spectrum DC component $\bar{\gamma}$, half power bandwidth $B_w$, and average power $\Psi_w$ parameters of a cell arrival rate of a new call, (b) a second circuit for transforming the three parameters $\bar{\gamma}$, $B_w$, $\Psi_w$ to two parameters $\bar{\gamma}$ and an equivalent average power $\Psi_e$, for a predetermined constant $B_e$, (c) a predetermined power spectrum based connection admission control table for retrieving a maximum aggregate equivalent average power $\Psi_{max}$ that can be accommodated by said node for all admitted calls, which $\Psi_{max}$ is indexed by at least a sum of an aggregate power spectrum DC component $\bar{\gamma}_T$ for all calls currently admitted at said node and $\bar{\gamma}$, and for determining whether or not to admit a new call by comparing a sum of an aggregate average power $\Psi_T$ of all calls currently admitted to said node and $\Psi_e$ to $\Psi_{max}$.

17. The apparatus of claim 16 wherein said first circuit receives in a call set up request from a cell source one or more parameters of said cell arrival rate in the time domain, and transforms the time domain parameters to the frequency domain to produce said parameters $\bar{\gamma}$, $B_w$, $\Psi_w$.

18. The apparatus of claim 16 wherein said constant $B_e$ is selected so as to be less than each expected value of $B_w$, said second circuit further comprising:

(d) a low pass filter and integrator for low pass filtering and integrating $\Psi_w$ to produce $\Psi_e$.

19. The apparatus of claim 16 further comprising:

(e) an accumulator for, in response to admitting a call to said node, increasing $\bar{\gamma}_T$ and $\Psi_T$ by the values $\bar{\gamma}$ and $\Psi_e$ of said admitted call, and (f) a user information table for storing in an entry thereof said values of $\bar{\gamma}$ and $\Psi_e$ of said admitted call if there is at least one said admitted call.

20. The apparatus of claim 19 wherein in response to disestablishing a call previously admitted to said node, said user information table retrieves said parameters $\bar{\gamma}$ and $\Psi_e$ of the disestablished call, and said accumulator reduces $\bar{\gamma}_T$ and $\Psi_T$ by the retrieved values of $\bar{\gamma}$ and $\Psi_e$.

21. The apparatus of claim 16 wherein said node admits both type-1 traffic calls for streamed communications and type-2 traffic calls for transactional communications, said apparatus further comprising:

(d) a register maintaining an aggregate cell arrival rate parameter $\Gamma_T$ of all type-2 traffic calls admitted to said node and said parameters $\bar{\gamma}_T$ and $\Psi_T$ for all type-1 traffic calls admitted to said node, wherein said power spectrum based admission control table uses $\Gamma_T$ as well as the sum of $\bar{\gamma}_T$ and $\bar{\gamma}$ to retrieve $\Psi_{max}$ for determining whether or not to admit a type-1 traffic call.

22. The apparatus of claim 21 wherein in admitting a new type-2 traffic call, said first circuit produces a cell arrival rate $\Gamma_{new}$ for said admitted type-2 traffic call, said predetermined power spectrum based connection admission control table retrieves a value of $\Psi_{max}$ contained in an entry indexed by the sum of $\Gamma_T$ and $\Gamma_{new}$ and $\bar{\gamma}_T$, and produces an indication indicating whether or not to admit said new type-2 traffic call by comparing a sum of $\Gamma_T$ and $\Gamma_{new}$ to a maximum aggregate cell arrival rate for type-2 traffic calls $\Gamma_{max}$ and by comparing $\Psi_T$ to the value of $\Psi_{max}$.

* * * * *